J. O. GREENWALD.
CREDIT SYSTEM.
APPLICATION FILED SEPT. 21, 1905.

939,245.

Patented Nov. 9, 1909.
2 SHEETS—SHEET 2.

Witnesses.
C. H. Keeney
R. S. C. Caldwell

Inventor.
Jacob Oscar Greenwald
by Benedict & Morsell
Attorneys

UNITED STATES PATENT OFFICE.

JACOB OSCAR GREENWALD, OF MILWAUKEE, WISCONSIN.

CREDIT SYSTEM.

939,245.  Specification of Letters Patent.  Patented Nov. 9, 1909.

Application filed September 21, 1905. Serial No. 279,391.

*To all whom it may concern:*

Be it known that I, JACOB OSCAR GREENWALD, residing in Milwaukee, in the county of Milwaukee and State of Wisconsin, have invented new and useful Improvements in Credit Systems, of which the following is a description, reference being had to the accompanying drawings, which are a part of this specification.

This invention relates to credit systems and comprises mechanism whereby a mark of authorization may be produced from a distance upon checks for credit accounts.

Heretofore in large department stores and similar establishments where open accounts are held with customers it has been usual to require the customer to wait until this check has been forwarded by pneumatic tube carriers or other means to the proper authority to receive the authorization stamp and then returned before his purchase will be delivered to him.

It is the object of the present invention to avoid this annoying delay and secure immediate authorization for the credit check. This is accomplished by providing telephones and electrical check punching or imprinting devices at the various sub-stations or sections of the establishment which are in connection with a central station where the credit man or the authority for extending credit is located with his records.

When goods are ordered to be charged on account, the clerk or attendant at the station places the check in the check punching device and telephones to the credit man the name and address of the customer, the amount of the purchase and like information, the credit man looks through his card indexes or other records to determine whether the customer is entitled to credit and finding that to be the case closes a switch, as by pressing a push button, and thereby produces the operation of the check punching device at the sub-station to punch or imprint the authorization stamp upon the check, all of which is accomplished in a very short time.

Another object of this invention is to perfect details of construction of such credit system apparatus so as to render the punching devices reliable in their operation and incapable of being actuated except by the proper authority.

With the above and other objects in view the invention consists in the mechanism and system herein set forth, their parts and combinations of parts, and all equivalents.

Figure 1:
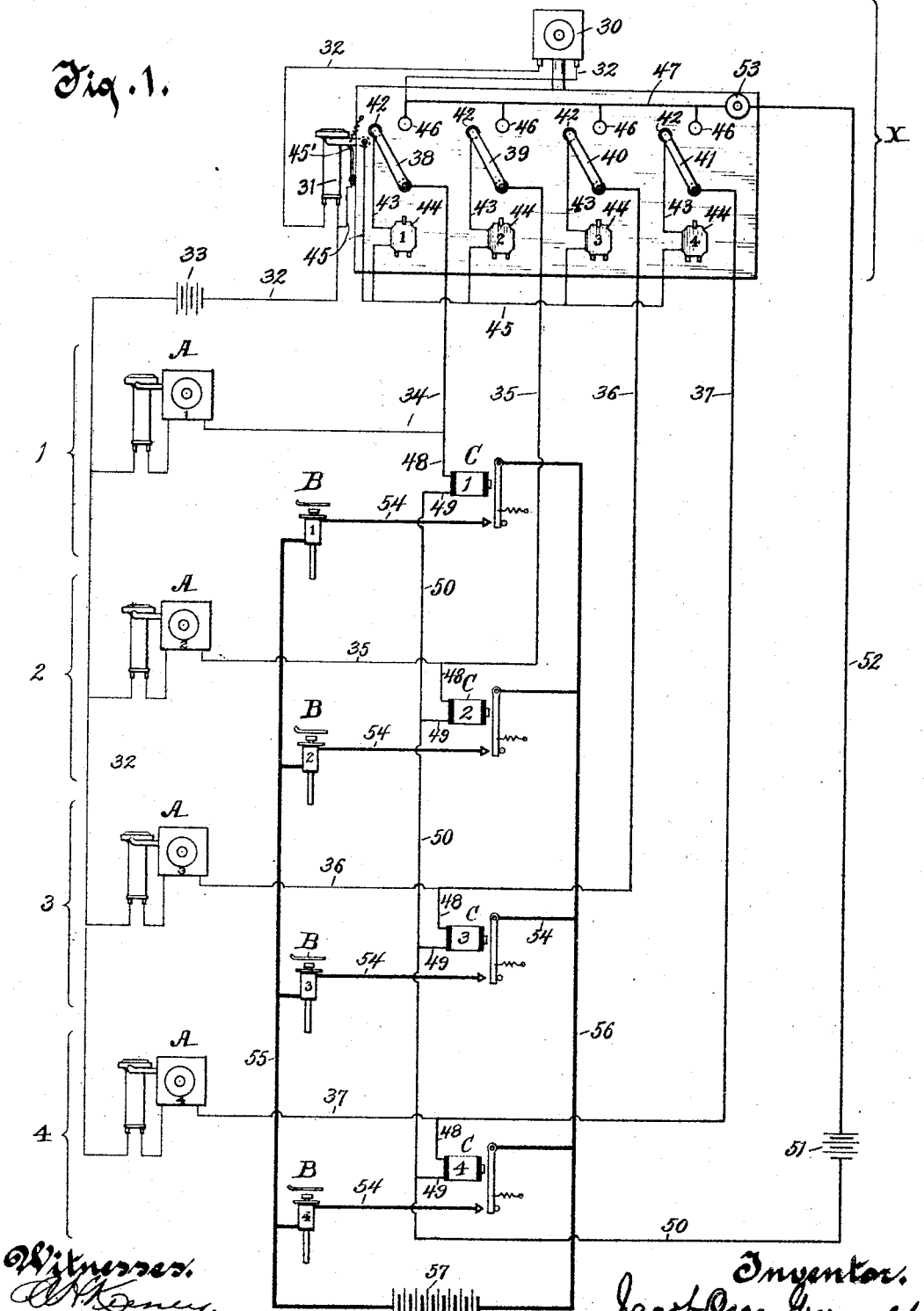
Figure 2:
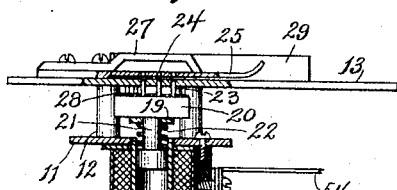
Figure 3:
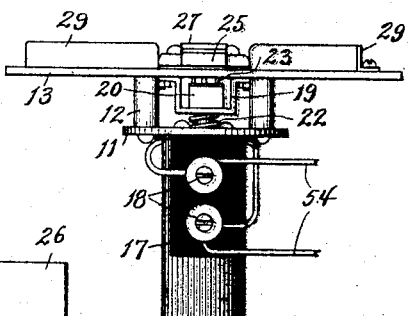
Figure 6:
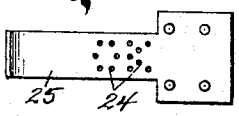
Figure 5:
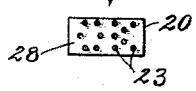
Figure 4:
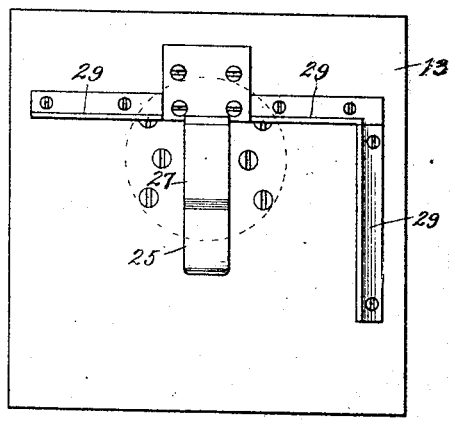

Referring to the accompanying drawings in which like characters of reference indicate the same parts in the several views:—Figure 1 is a diagram of a credit check punching system as comprehended by this invention; Fig. 2 is a vertical sectional elevation of one of the check punching devices; Fig. 3 is an elevation thereof; Fig. 4 is a plan view thereof; Fig. 5 is a plan view of the punch member; Fig. 6 is a plan view of the die strip; and, Fig. 7 indicates a fragment of a credit check with the authorization stamp thereon.

In these drawings the check punching device comprises an electric solenoid 10 supported in a vertical position by being mounted at its upper end on a plate 11, which is connected by a number of upright posts or bolts 12 with a top plate 13 adapted to rest upon the upper surface of a desk or counter with the solenoid passing down through an opening. The solenoid core tube 14 is extended beneath the solenoid and has a solid bottom 15 upon which the inclosed core 16 normally stands. An insulating block 17 is mounted at the side of the solenoid by being secured to the plate 11, and a pair of binding posts 18 thereon receive the terminals of the solenoid winding.

A U-shaped cleat or punch rest 19 is secured to the under side of the top plate 13, and a punch member 20 normally rests thereon with its depending reduced stem 21 passing through an opening in the punch rest and entering the upper end of the core tube of the solenoid. Here the stem is enlarged to form a shoulder against which its surrounding coil spring 22 presses at one end while at the other end it bears against the under side of the punch rest so as to normally hold the punch member down upon the punch rest. The enlarged lower end of the punch stem 21 is in the path of the solenoid core, so that when the core is lifted by the solenoid it will strike the stem a hammer blow and drive the punch member upwardly with force. The upper face of the punch member 20 is provided with a number of punch pins 23 which are preferably arranged to form the letters O K, as shown in Fig. 5, and these punch pins ride through similarly arranged perforations in the top plate 13 and are adapted to enter other similarly arranged perforations 24 in a die strip 25 which is secured at one end on the top plate. The other end of the die strip is free and turned upwardly to form a guide for a paper check 26 which may be entered between the die strip and the surface of the top plate 13. A bracing strip 27 is mounted upon the die strip 25 and arches over the perforated portion thereof to brace it against being bent upwardly in any way. The upper surface of the punch block 20 is preferably provided with a sheet of cushioning material 28 to act as a buffer between it and the top plate 13 when the punch is operated.

Figure 7:
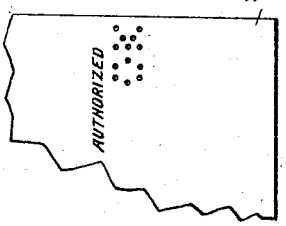

When the solenoid is energized and its core 16 strikes the punch member and drives it upwardly, the punch pins 23 which normally stand in the perforations of the top plate are forced upwardly through the openings 24 of the die strip, thereby perforating the paper check 26 placed beneath said die strip with the letters O K, as shown in Fig. 7. When the solenoid is deënergized its core 16 drops upon the solid bottom 15 of the solenoid tube, the upper end of which tube is turned over upon the plate 11 to securely hold it in place against the blow received in this manner. In order that the paper check may be perforated at the proper place flanged guides 29 are arranged on the top plate 13 against which the edges of the check are brought to bear. The core tube 14 of the solenoid is preferably perforated at its lower end in order that the core may not be retarded in its movements by forming air cushions, though it may be sufficiently loose in the core tube to allow the air to freely pass. These check punching devices may be electrically connected in any desired manner with the central station and may be intimately associated with the telephone system from each of the sub-stations to the central station or they may be entirely independent thereof. It is desirable, however, that the operation at the central station may be simplified as much as possible by combining the telephone system with the punch operating system in such a manner that as the credit man at the central station makes the necessary telephone connection with the sub-station which has signaled him, such connection will establish the connection for the punch operating system of that sub-station, and when the circuit closing means for the punch operating system is closed the punch operating device of that one sub-station only will be operated. I have therefore indicated in the diagram of Fig. 1 such a combination of the telephone system and the punch operating system in preference to illustrating the separate and independent systems, though it is to be understood that I do not desire to restrict myself to the particular system here shown, but reserve the right to modify this system however it may be desirable, or to substitute the independent telephone and punch operating systems referred to.

In the diagram shown in Fig. 1, there is represented a central station X in connection with four different sub-stations numbered 1, 2, 3 and 4 respectively, though obviously the number of sub-stations may be increased indefinitely. The apparatus at the central station is represented as mounted on a switch board and includes an ordinary telephone transmitter 30 and receiver 31 which are connected together in a telephone circuit 32 shown by fine lines.

The apparatus at each of the sub-stations comprises a set of telephone instruments A, a magnetic check punching device B and a relay C for operating the latter, and each of these is marked with the numeral of the sub-station to which it belongs. The telephone sets of the several sub-stations are connected in multiple, each line leading from the common telephone circuit wire 32, which contains a battery 33, and returning to the switch board of the central station by way of separate station wires 34, 35, 36 and 37 respectively. Here they connect with switch arms 38, 39, 40 and 41 respectively which constitute two-point switches normally left upon contact points 42, as shown, from which wires 43 lead through annunciators 44 to a common return wire 45 which connects with the telephone wire 32 between the battery 33 and the central station telephone instruments and contains a switch 45' operated by the receiver hook so as to open when the receiver is removed. Each of the annunciators 44 is numbered as usual to correspond with the number of the sub-station with which it is connected. The telephone sets A of the sub-stations are of an ordinary type in which the circuit therethrough is opened as long as the receiver is hanging on the hook, but which is completed for signaling the central station and for closing the telephone circuit when the receiver is removed from the hook.

When the receiver at any sub-station is removed from its hook the signaling circuit completed by this operation causes the corresponding annunciator plate to drop in the usual manner to indicate to the credit man at the central station that communication is desired by that sub-station. For instance, when the receiver of sub-station 3 is removed from its hook by the attendant, a circuit is completed from battery 33, through the wire 32 and the telephone instruments of sub-station 3, by wire 36 to the two point switch 40 on the switch board at the central station, and through the wire 43 thereof and the annunciator marked 3 through wire 45 and the closed switch 45' to wire 32 which returns to battery 33. This circuit causes annunciator 3 to drop, and it is then the duty of the credit man to change the switch thereabove, which is switch 40, to its other contact point, 46, and thereby cut the annunciator out of circuit and substitute the telephone instruments of the central station, since the wire 32 after leaving the transmitter 30 connects with a wire 47 which joins all of the contact points 46 of the two point switches. Then the circuit from switch 40 is through wires 47 and 32, the transmitter 30 and the receiver 31 to the battery 33, instead of through the wires 43 and 45, the switch 45' and the annunciator marked 3. Thus the signaling circuit established by the attendant at sub-station 3 is converted into a telephone circuit including the telephone instruments of sub-station 3 and the telephone instruments of the central station. When the receiver 31 is removed from its hook the switch 45' is opened to disconnect the other annunciators from the telephone circuit so as to avoid possible interference between the telephone system and the punching system when the latter is operated.

The system so far as at present explained may be considered the telephone system, but the station wires 34, 35, 36 and 37 thereof are also utilized as station wires in the check punching system. The relay magnet of relay C at each sub-station is connected to the station wire of that sub-station by means of a wire 48 and is also connected by a wire 49 with a wire 50 which connects with a battery 51 from which a wire 52 leads to a push button 53 at the central station, adapted when pressed to connect said wire 52 with the wire 47 before referred to. It will be seen that the operation of changing the two point switch of any sub-station from its normal contact point 42 to its other contact point 46, besides establishing the telephone circuit for that sub-station, also establishes the relay circuit for the same sub-station, subject to the operation of the push button 53.

Assuming that switch 40 has been moved into engagement with contact point 46 by the credit man, as before described, to establish telephonic communication with sub-station 3, and that the information furnished him during the conversation is found by his records to warrant his approval of the credit charge, it is then his duty to press the push button 53 and thus cause the operation of the check punching device B at sub-station 3, which will be done as follows. The closing of push button 53 completes a circuit from battery 51 through wire 52 and said push button to wire 47, and through switch 40 which is then in engagement with contact point 46, through wire 36 to wire 48 and through the magnet of the relay C of sub-station 3, and by way of the wires 49 and 50 back to the battery 51. This produces a movement of the relay armature to close its contacts in the usual manner, which will close a punch operating circuit through the magnetic punch of sub-station 3, as the punch solenoid of the punching device B of each sub-station is connected by a wire 54 in series with the contacts of the relay C of that sub-station, and all of the punch solenoids with their respective relay switches are connected in multiple between wires 55 and 56 which are the terminals of a strong electric battery 57 or other source of electric supply, so that when any one of the relay switches is closed by its magnet becoming energized it completes the punch operating circuit through the magnetic punching device of that sub-station. Thus the closing of the relay switch at station 3, as just described, will complete the punch operating circuit through the punching device B of station 3, since a circuit is complete from battery 57, through wires 56 and 54, including the closed relay switch and the solenoid of the punch, and by way of wire 55 back to the battery 57.

The credit man at the central station having pressed the push button 53 and caused the magnetic punch B at station 3 to perforate the characters O K in the charge check from which the information was telephoned to him, restores the switch board to its original condition by returning the receiver 31 to the hook, lifting the annunciator marked 3 and moving switch 40 back to its contact point 42, the attendant at station 3 having in the meantime returned the receiver of that telephone set to its hook.

The operation for all stations will be the same as that above described and the communication with the central station and the effect of the closing of the push button 53 will only be had with that station for which the two point switch has been changed from its normal position.

While relays are shown for controlling the check punching devices, it is obvious that the check punching devices may be put in place of the relays, so that they are operated directly by the push button 53 instead of through the intervention of the relays. The push button or circuit closer is referred to in the claims as adapted to be connected with the check punching devices with the broad meaning including the direct connection and the indirect connection with the relays. The main object in employing the relays is to reduce the resistance of the punch operating circuit by excluding the station wires therefrom to enable a strong current to be used therewith. To distinguish between the several circuits the punch operating circuits are shown in heavy lines, the relay operating circuits are shown in intermediate lines and as before stated the signal and telephone circuits are shown in light lines.

It is obviously unnecessary that the check marking device should perforate the check, for the same object may be accomplished by other means, such as by stamping, imprinting or embossing any desirable character on the check, and it is to be understood that wherever such terms as "punching" are employed in the specification or claims it is intended to include such equivalent means.

This case was divided and Letters Patent No. 820,713, issued to me on May 15, 1906, constitute the division thereof.

What I claim as my invention is;

1. In a credit system, a central station and a series of sub-stations, telephones at the sub-stations connected with the central station, annunciators at the central station for the sub-stations adapted to be operated from the respective sub-stations, a telephone at the central station, switch mechanism for connecting the telephone at the central station with the telephone at any of the sub-stations, check punching devices at the sub-stations having connection with the central station, and a circuit closer at the central station adapted to be placed into connection with the check punching device of any sub-station by the operation of the switch mechanism for connecting the telephone of that sub-station with the telephone of the central station, whereby the operation of the circuit closer will produce the operation of the check punching device of that sub-station which is in telephone communication with the central station.

2. In a credit system, a central station and a series of sub-stations, telephones at the sub-stations connected with the central station, annunciators at the central station for the respective sub-stations, switches at the central station for normally connecting the annunciators with respective sub-stations so as to be operated therefrom, a telephone at the central station adapted to be substituted for the annunciator of any sub-station by the change in position of the switch for that sub-station, check punching devices at the sub-stations, a circuit closer at the central station having connection with said switches and adapted to be connected with the check punching device of any sub-station when the switch for that sub-station is in position to connect the telephone of said sub-station with the telephone of the central station, whereby the operation of the circuit closer will produce the operation of the check punching device of that sub-station having telephone communication with the central station.

3. In a credit system a central station and a series of sub-stations, telephones at the sub-stations, station wires connecting the telephones of the respective sub-stations with the central station, annunciators at the central station for the respective sub-stations, switches at the central station for normally connecting the annunciators with the station wires of the respective sub-stations so as to be operated from said sub-stations, a telephone at the central station adapted to be substituted for the annunciator of any sub-station by the change in position of the switch for that sub-station, relays at the sub-stations connected with the station wires thereof, a circuit closer at the central station having connection with the said switches and adapted to be connected with the relay of any sub-station when the switch for that sub-station is in the position to connect the telephone thereof with the telephone of the central station, whereby the operation of the circuit closer will produce the operation of the relay of that sub-station which has telephone communication with the central station, and a check punching device at each sub-station to be operated by the operation of the relay of that sub-station.

In testimony whereof, I affix my signature, in presence of two witnesses.

JACOB OSCAR GREENWALD.

Witnesses:
C. DORNBACH,
C. T. BENEDICT.